United States Patent [19]
Scheer et al.

[11] Patent Number: 5,425,604
[45] Date of Patent: Jun. 20, 1995

[54] DRILLING TOOL

[75] Inventors: Gerhard Scheer, Loechgau; Rainer Perthen, Besigheim, both of Germany

[73] Assignee: Komet Praezisionswerkzeuge Robert Breuning GmbH, Besigheim, Germany

[21] Appl. No.: 142,397

[22] PCT Filed: May 15, 1992

[86] PCT No.: PCT/EP92/01070
§ 371 Date: Nov. 19, 1993
§ 102(e) Date: Nov. 19, 1993

[87] PCT Pub. No.: WO92/20483
PCT Pub. Date: Nov. 26, 1992

[30] Foreign Application Priority Data
May 22, 1991 [DE] Germany ............... 41 16 615.9
Oct. 28, 1991 [DE] Germany ............... 41 35 498.2

[51] Int. Cl.⁶ ..................... B23B 41/02; B23B 51/00
[52] U.S. Cl. ............................ 408/83; 408/201; 408/225; 408/233; 408/705
[58] Field of Search ............... 408/81, 83, 201, 225, 408/233, 705, 713

[56] References Cited
U.S. PATENT DOCUMENTS

| | | | |
|---|---|---|---|
| 3,816,018 | 6/1974 | Hlocky | 408/713 |
| 3,942,905 | 3/1976 | Gill et al. | 408/204 |
| 3,963,365 | 6/1976 | Shallenberger et al. | 408/713 |
| 4,248,555 | 2/1981 | Satou | 408/225 |
| 4,264,246 | 4/1981 | Lowis et al. | 408/705 |
| 4,353,670 | 10/1982 | Jorgensen | 408/201 |

FOREIGN PATENT DOCUMENTS

| | | |
|---|---|---|
| 915668 | 11/1946 | France . |
| 1224211 | 6/1960 | France . |
| 3234238 | 3/1984 | Germany . |
| 579356 | 7/1958 | Italy ............... 408/83 |
| 567630 | 2/1945 | United Kingdom ............... 408/225 |
| 1509194 | 9/1989 | U.S.S.R. ............... 408/705 |

OTHER PUBLICATIONS

"Wendeplattenbohrer Fur Grosse Bohrtiefen", by Ulrich Krenzer, *Werkeuge* (Aug., 1990), pp. 38-40.

*Primary Examiner*—Steven C. Bishop
*Attorney, Agent, or Firm*—Flynn, Thiel, Boutell & Tanis

[57] ABSTRACT

A drilling tool has a drilling crown (12) removably arranged on a shank (10) at its front face, provided with two complementary regions that are mutually separated by chip channels (20) and that have partially circumferential surfaces (48). The drilling tool also has at least two cutting plates (14, 14', 16, 16') secured to the regions of the drilling crown and spaced apart by an angle of 180°, as well as a centering drill (26) centrally arranged in the drilling crown in the axial direction that projects over the front face of the latter. The cutting edge (18) of the outermost cutting plate (14) in the radial direction radially projects over the circumferential surfaces (48) of the drilling crown (18), whereas the working area of the innermost cutting plate radially approaches or overlaps the working area of the centering drill (26). In order to allow through holes to be cut without risk of damage, even in the case of deep holes, a guiding element (58) that radially projects slightly less than the cutting edge (18) of the outermost cutting plate (14) in the radial direction is arranged on both circumferential surfaces (48), axially spaced from the front face of the cutter and spaced apart from each other by an angle other than 180°.

26 Claims, 6 Drawing Sheets

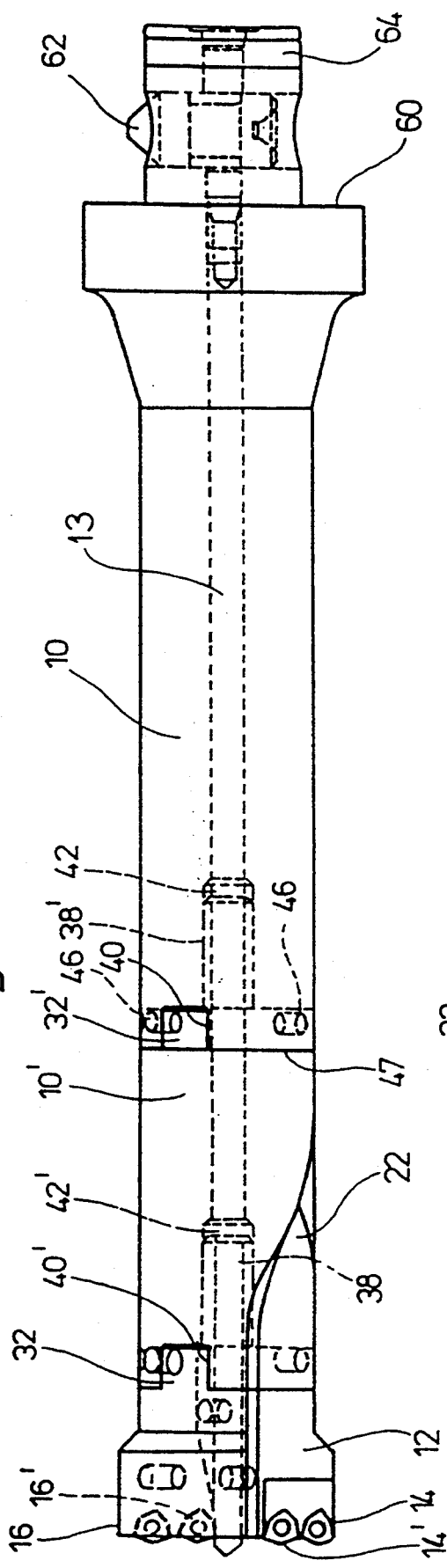
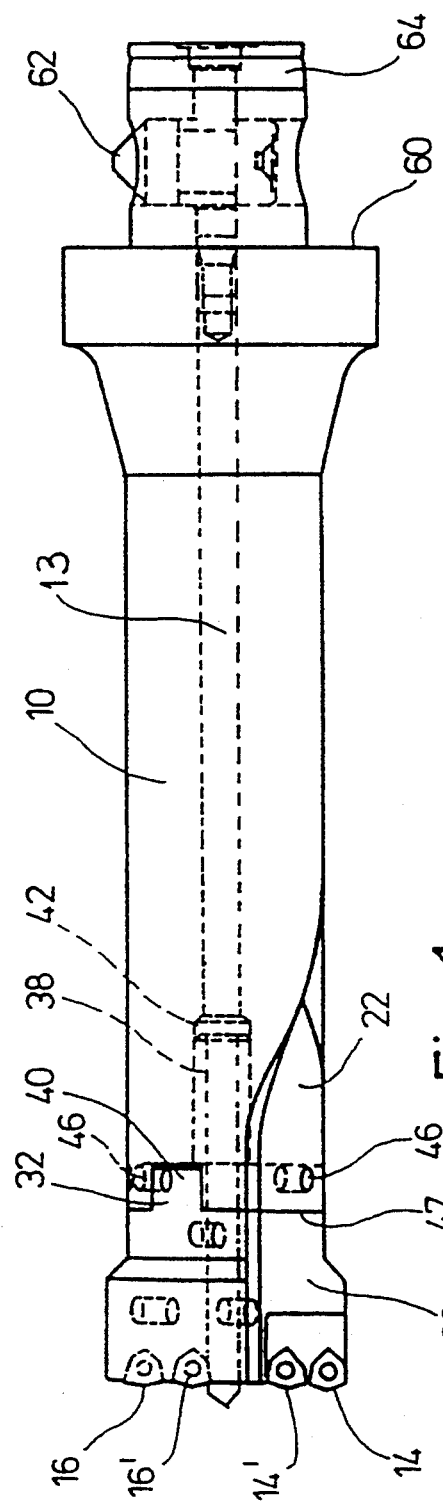

DRILLING TOOL

FIELD OF THE INVENTION

The invention relates to a drilling tool for machine tools comprising a shank having at least one chip groove, a drilling crown preferably removably arranged on the front face on the shank and having at least two regions with partially cylindrical circumferential surfaces, a corresponding number of chip channels adjoining the regions and being essentially axially parallel aligned and ending rearwardly into the associated chip groove, and at least two cutting plates which are arranged at a radial distance from the shank axis with work areas that at least partially radially overlap one another in each other recess of the regions in the area of the chip channels and each of which has at least one active cutting edge projecting at the front face over the drilling crown with the cutting edge of the radially outermost cutting plate radially extending over the partially cylindrical circumferential surfaces.

BACKGROUND OF THE INVENTION

A drilling tool of this type is known (AT-B-383070) in which, through a special alignment of the cutting plates which partially overlap one another in the effective range of their cutting edges, care is taken that the transverse forces existing at the cutting edges during the drilling operation are essentially cancelled so that bores or holes can be created in a workpiece without any guidance. However, problems arise when during drilling through a workpiece or through a stack of plates the automatic centering by the cutting plates does not take place and the tool hits with the circumferential surfaces of the drilling crown against the edge of the bore. This can result, mainly in the case of great boring depths over $4 \times D$ (D=drill diameter), in damage to the workpiece or the drilling tool.

Based on this, the basic purpose of the invention is to further improve the drilling tool of the above-disclosed type so that it can also carry out drillings at great boring depths.

SUMMARY OF THE INVENTION

To attain this purpose the invention suggests that in the area of at least one of the partially cylindrical circumferential surfaces at an axial distance from the drilling crown front face there is arranged a guide element radially projecting slightly less than the cutting edge of the radially outermost cutting plate. According to a preferred embodiment the invention, two guide elements are provided which are spaced from one another at an angular distance differing from 180° and are spaced advantageously at an axial distance from one another. The drilling crown has advantageously two diametrically opposed chip channels or regions, while the cutting plates are spaced individually or in pairs at an angular distance of approximately 180° from one another.

The guide elements of the invention ensure that the tool, during drilling within the bore, is guided on the wall of the bore without the circumferential surfaces of the drilling crown hitting the outer edge of the bore. When drilling through workpieces with an inclined rear surface an additional problem arises, namely the drill initially exits the bore on one side thereof while the drill is still guided in the bore above the opposite circumferential part. The incline can thereby be such that the inventive guide elements of the drilling crown already have exited through the earliest point of exit before the workpiece has been completely drilled through. This causes the drill to be deflected and to hit with its shank against the wall of the bore in the area of the earliest point of exit. The problem exists thereby that the cutting plates, which are still engaged, are being destroyed. Furthermore, the bore is not fully produced and the wall of the bore is destroyed in the area of the point of exit. In order to avoid this disadvantage, it is suggested according to a preferred embodiment of the invention that a further guide element is arranged at an axial distance from the guide element or one of the guide elements in the area of the partially cylindrical circumferential surfaces, and that the axially adjacent guide elements are spaced from one another in pairs at an angular distance differing from 180°. The guide elements can thereby also be arranged on the partially cylindrical circumferential surfaces of the drill shank when the incline of the rear surface to be drilled through requires this. The same is also true for one-piece drills, in which the drilling crown and the drill shank are connected in one piece with one another.

The reciprocal angular distance between the two guide elements is advantageously chosen between 120 and 170°, preferably at 140°. With this it is avoided that the drilling crown with its guide elements gets wedged in the bore during breaking through the inclined rear surface of the bore by the tool. The guide elements should for the same reason be spaced from the cutting plates at an angular distance differing from 90° and differing from 180°. The angular distance between the radially outermost cutting plate and the adjacent guide element is advantageously greater than the angular distance between the radially innermost cutting plate and the adjacent guide element. In the first case an angle of 45 to 80° preferably 65°, and in the latter case an angle of 15 to 45°, preferably 25°, have proven to be the best.

The guide elements are advantageously arranged at different axial distances from the front face of the drilling crown. The axial spacing of the guide elements has, among others, the advantage that the guide elements do not alone but one after the other exit the edge of the bore, while the guide elements, which are still within the bore, are supported in the wall of the bore. This also reduces the danger that the guide elements can cause undesired markings near the point of exit on the wall of the bore. The axial spacing of the guide elements has also an advantage when drilling through stacks of plates since the guide elements penetrate not together but one after the other through the joints or spaces between the individual plates of a stack of plates.

The guide elements, which preferably consists of a hard metal, are advantageously constructed in a ball-like shape, in particular as a spherical segment, at their projecting part so that only a pointwise support takes place and the orienting of the guide elements during mounting on the drilling crown is not important.

According to a preferred embodiment of the invention, the guide elements are radially adjustably arranged on the drilling crown. On the one hand a compensation of wear is possible with this relatively simple means. On the other hand an adjustment to the radial projection of the outermost cutting plate can be achieved with this, which is of an advantage in particular when the radially outermost cutting plate can be radially adjusted on the drilling crown. Each guide element is advantageously formed by a pin arranged in a radial bore of the drilling crown and radially projecting out of the radial bore with its ball-like end, with the radial bore being constructed as a taphole and the pin as a threaded pin. The pin is thereby advantageously clamped with a clamping screw in the radial bore. The guide element consisting of hard metal or ceramics is advantageously soldered or glued to the end of the pin, which end projects over the radial bore.

For the drilling of deep holes with a depth of more than 5×D, the invention suggests according to a preferred embodiment that a centering drill, which projects axially centrally over the front face of the drilling crown and over the cutting edges of the cutting plates, is arranged releasably and axially adjustably in the drilling crown, with the working area of the radially innermost cutting plate approaching or overlapping radially the work area of the centering drill. The centering drill is advantageously axially movable in the drilling crown by means of an adjusting screw and can be clamped in same by means of a clamping screw. The centering of the drilling tool in the bore is thereby handled by the centering drill until the breaking through of the bore and thereafter by the guide elements.

According to a further advantageous development of the invention, the drilling crown has a transverse rib at its end opposite the front face which transverse rib projects over a plane surface and can be guided into a transverse groove of the shank, which transverse groove is limited by a flat countersurface and can there be clamped by means of clamping screws, and a centering pin which can be placed into a center mating hole of the shank, and which projects axially centrally over the transverse rib, and, if necessary, is formed by the rearward end of the centering drill. To create the clamping connection, conical recesses are arranged offset with respect to one another in longitudinal direction of the transverse rib in two boundary surfaces of the transverse rib, which boundary surfaces lie opposite one another and are perpendicular with respect to the plane surface, into which recesses a screw with a conical tip is guided from a taphole of the shank and extends through the sides of the transverse groove, can be screwed with such an axial shift that the drilling crown and the shank are pressed axially against one another at their plane surfaces, which are facing one another. This connecting principle can in general be utilized in tools, which have a shank and a blade carrier preferably constructed as a drilling crown and arranged on the front face on the shank.

The cutting plates are advantageously constructed as hexagonal reversing cutting plates, which each project with two active cutting edges over the front face of the drilling crown. The radially outermost reversing cutting plate is, if necessary, together with an immediately adjacent reversing cutting plate which is arranged radially inwardly thereof arranged in a cassette, which can be radially offset in the recess of the respective region. It is advantageous in order to drill through the stacks of plates when the two active cutting edges of each cutting plate are radially outwardly inclined with respect to the tool axis. This permits the two radially outermost cutting plates to be arranged on the same radius and to radially overlap the partially cylindrical circumferential surfaces. The latter is particularly the case for small drill diameters.

BRIEF DESCRIPTION OF THE DRAWINGS

The invention will be discussed in greater detail hereinafter in connection with the exemplary embodiments schematically illustrated in the drawings, in which:

FIGS. 1a and b are each a side view of two drilling tools with differently long shanks and the same drilling crown;

FIGS. 3a to 3c illustrate a drilling crown with four cutting plates and centering drills in a side view, a bottom view and a cross-sectional view along the cross-sectional line 3c—3c of FIG. 3a;

DETAILED DESCRIPTION

Figure 2:
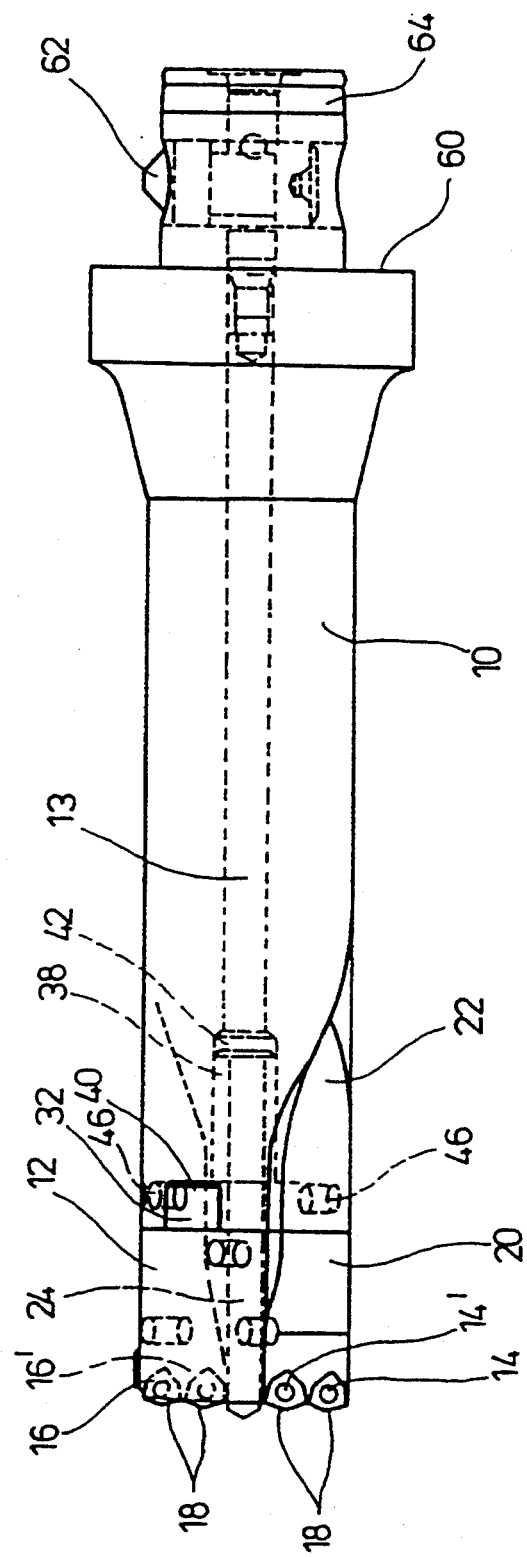
FIG. 2 is a drilling tool corresponding to FIG. 1a with a smaller drilling crown.

The drilling tools illustrated in the drawings consist essentially of a shank 10 and a drilling crown 12 positively and frictionally connected at the front face to the shank 10. The drilling crown 12 has four (FIGS. 1 to 3), two (FIG. 4) or rather three (FIG. 6) hexagonal reversing cutting plates 14, 14', 16, 16' arranged at various radial distances from the shank axis 13, which cutting plates each project with two cutting edges 18 defining an acute angle of 120 to 160° with one another at the front face of the drilling crown 12. The reversing cutting plates are arranged such that their active cutting edges overlap partially radially in their working areas. They are each arranged in pairs, or individually in recesses 19 of a concentric side of a chip channel 20, which terminates at its rear end in a preferably helically extending chip groove 22 of the shank 10. A centering drill 26 is additionally arranged axially adjustably by means of an adjusting screw 27 having an adjusting cone 27' and fixable by means of an fixing screw 28 on the drilling crown 12 in an axially central bore 24 of the drilling crown 12, the centering drill 26 projects with its tip axially over the front face of the drilling crown 12 and the cutting edges 18 of the reversing cutting plates 14, 14', 16, 16'.

Figure 3A:
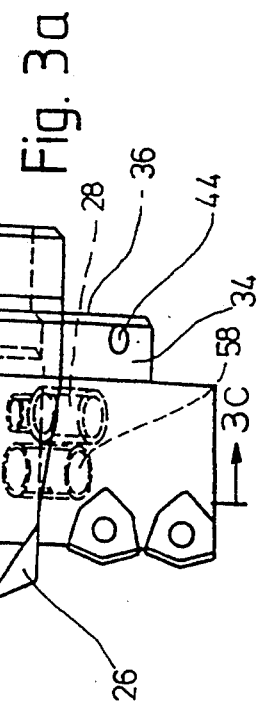
Figure 4A:
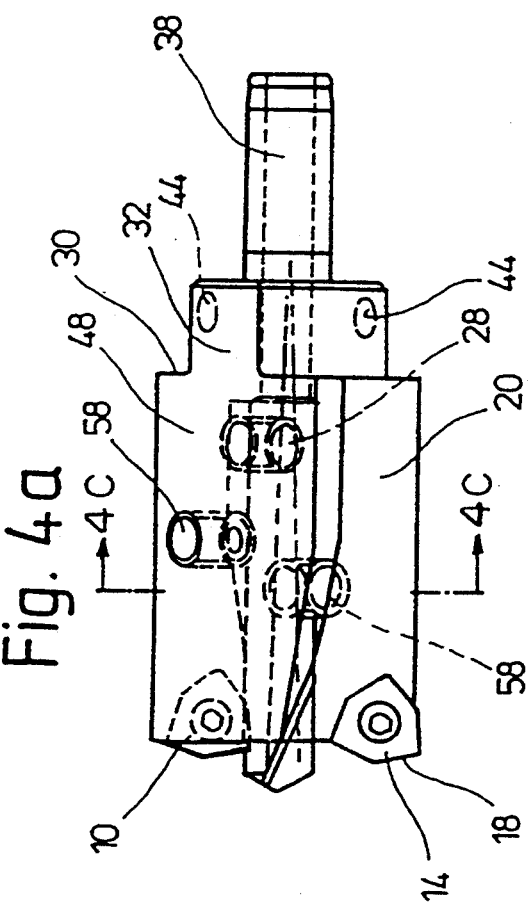
Figure 5:
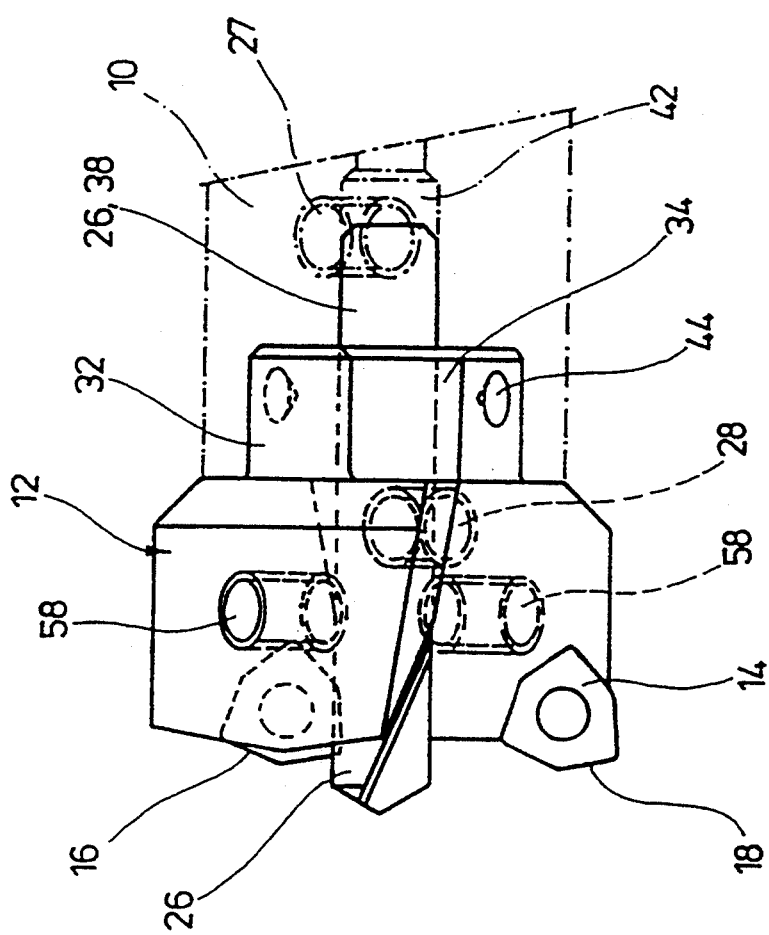
FIG. 5 is a side view of a drilling crown with an axially through-extending centering drill.

The drilling crown 12 has a cross rib 32 rearwardly projecting over a plane surface 30, which cross rib 32 is defined by two lateral plane flanks 34 and a flat face flank 36 and on the face flank 36 of which projects axially centrally in the middle a fitted pin 38. The fitted pin 38 can either be arranged or formed directly on the drilling crown 12 (FIGS. 3a, 4a) or can be formed by the rearward end of the centering drill 26 extending through a center bore of the drilling crown 12 (FIG. 5). The transverse rib 32 can be inserted into a corresponding transverse groove 40 arranged on the front face on the shank 10, while the fitted pin 38 extends into an axially central mating bore 42 of the shank. Each one conical recess 44 is provided on the side flanks 34 of the transverse rib, which recesses are arranged offset with respect to one another in the longitudinal direction of the transverse rib 32 and into which extends each one screw with its conical tip, which screw is guided in a screw bore 46 of the shank 10. The axes of the screw bore 46 and of the conical recesses 44 are arranged offset with respect to one another in such a manner that plane surfaces 30, 47 of the drilling crown 12 and of the shank 10, which plane surfaces face one another, are pressed against one another during tightening of the clamping screws. The transverse rib 32 is at the same time set clearance-free within the transverse groove 40 by the clamping screws. As can be seen in FIG. 1b, an extension piece 10' can be arranged between the shank 10 and the drilling crown 12, which extension piece 10' is positively and frictionally anchored with a transverse rib 32' and a fitted pin 38' in the transverse groove 40 and the mating bore 42 of the shank 10, and which extension piece 10' has a transverse groove 40' and a mating bore 42' for receiving the transverse rib 32 and the fitted pin 38 of the drilling crown 12.

Figure 3C:
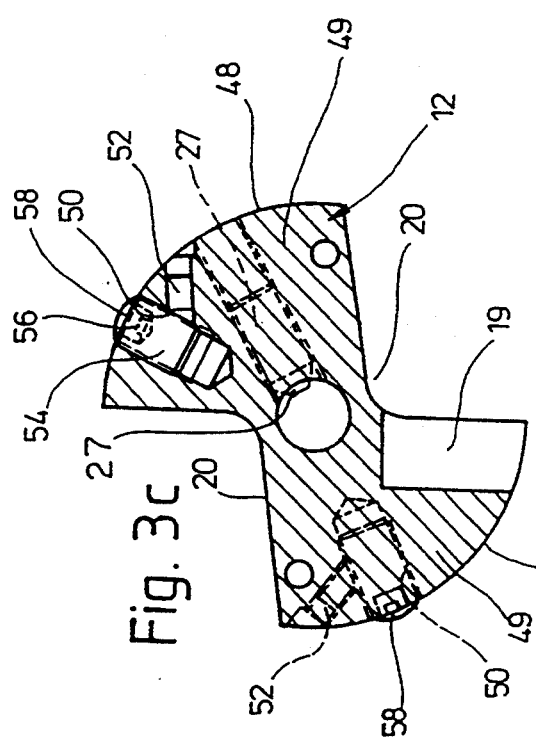
Figure 4C:
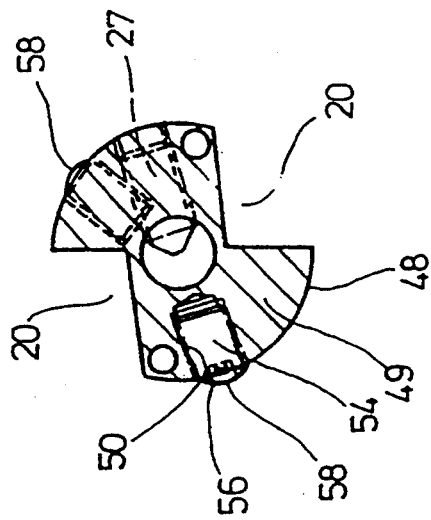
FIGS. 4a to 4c illustrate a drilling crown with two cutting plates and centering drills in a side view, a bottom view and a cross-sectional view along the cross-sectional line 4c—4c of FIG. 4A.
Figure 4B:
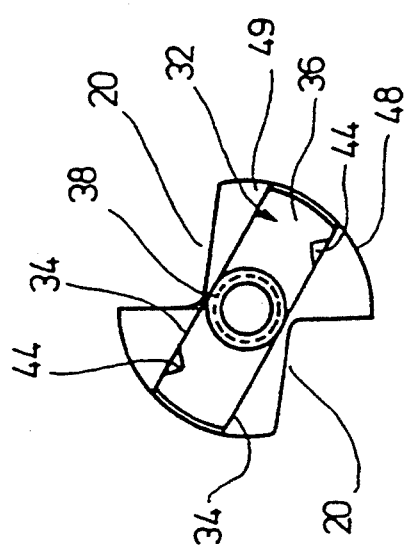

The drilling crown 12 is defined by two diametrically opposite regions 49 with partially circular circumferential surfaces 48, in which is arranged each one screw bore 50 for receiving a radially adjustable screw pin 54 lockable by means of a clamping screw 52. A hardmetal part 56 is soldered to the radially outwardly pointing end of the screw pin 54, which hard-metal part 56 forms with its ball-shaped end projecting over the radial bore 50, a guide element 58. The guide elements 58 are set back axially with respect to the front face of the drilling crown and are spaced at a small axial distance from one another. Their reciprocal angular distance is 140° in the case of FIG. 3c, and 145° in the case of FIG. 4c. The radially adjustable cutting plates 14, 14' which lie radially outside the respective cutting plates 16, 16', define with the adjacent guide element 58 an angle of 65° (FIG. 3c) or rather 70° (FIG. 4c), while the plates 16, 16' which lie radially inside the respective cutting plates 14, 14' define with the adjacent guide element 58 an angle of 25° (FIG. 3c) or rather 35° (FIG. 4c).

Figure 6:
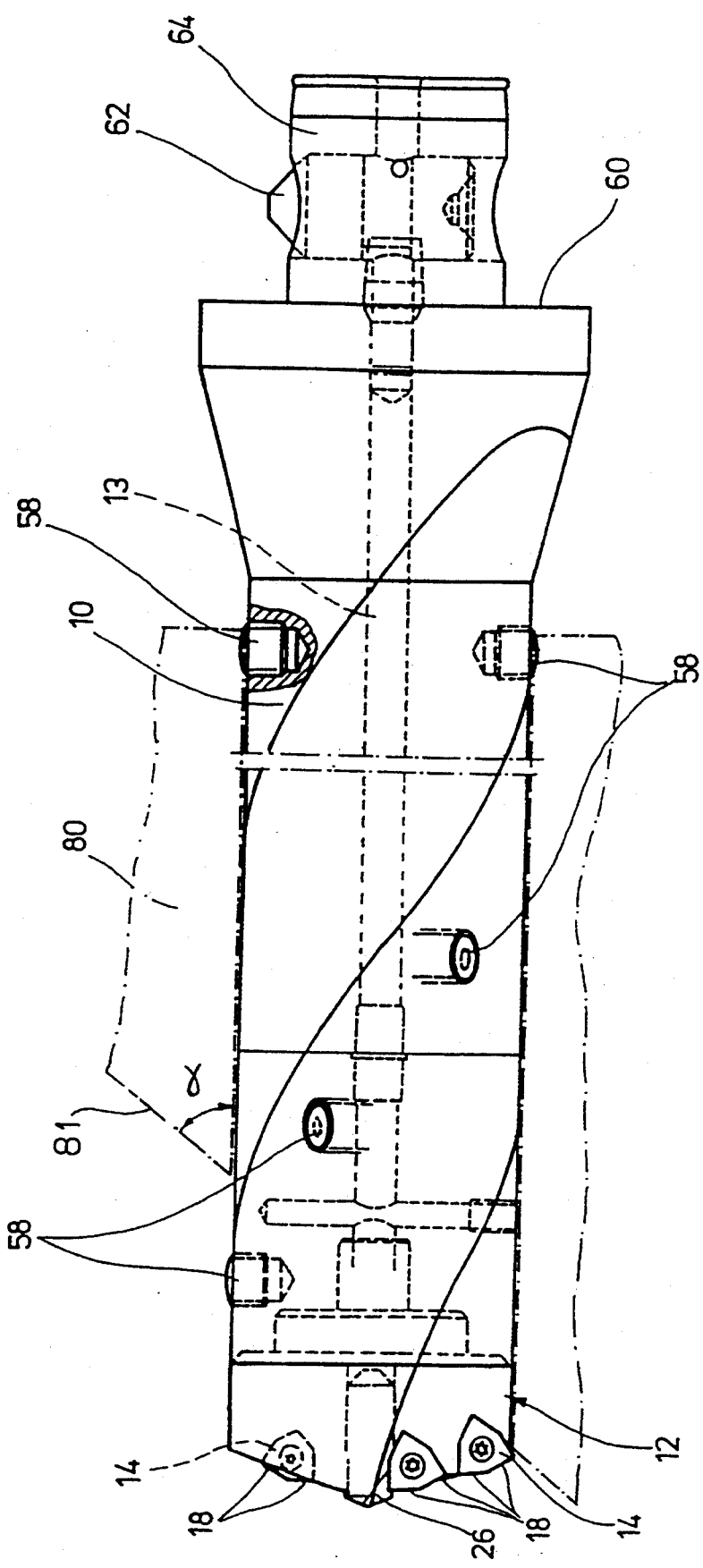
FIG. 6 is a side view of a drill for drilling through workpieces with an inclined rear surface.

The drill shown in FIG. 6 is mainly used for drilling through workpieces 80 with an inclined rear surface 81, which in the illustrated exemplary embodiment defines an angle a of 40° with respect to the bore axis. In order to assure that the drill is sufficiently supported during the one-side exit from the workpiece rear surface, further guide elements 58 arranged axially spaced from one another on the partially cylindrical circumferential surfaces of the tool shank 10. This prevents the drill from being deflected away from the bore wall and hitting with its shank, the other side of the bore wall in the area of the earliest exit point during the one-sided exit from the bore. Furthermore, the two active cutting edges 18 of each of the three cutting plates 14 are in the exemplary embodiment illustrated in FIG. 6 radially outwardly inclined. Due to this arrangement of the cutting plates, this drill is also suited for drilling through stacks of plates.

Figure 3B:
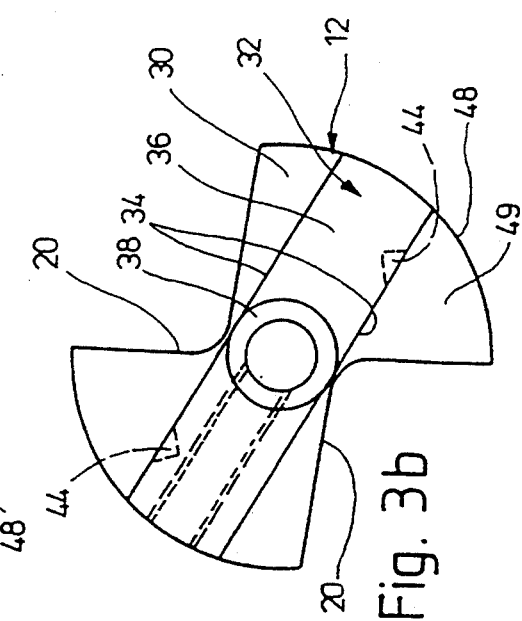

As is shown by comparison of FIG. 1 with FIG. 2, the same shank 10 can be equipped with drilling crowns 12 having different diameters. The shank 10 carries at its rearward end opposite the drilling crown a fitted pin 64, which projects axially over an annular surface 60 and is provided with a movable transverse bolt 62, for connection to a machine spindle (not illustrated) having a corresponding mounting.

In conclusion the following is to be stated: The invention relates to a drilling tool with a drilling crown 12 removably arranged on the front face on a shank 10 and having two regions with partially cylindrical circumferential surfaces 48 separated by chip channels 20, at least two cutting plates 14, 14', 16, 16' having, at the regions of the drilling crown, an angular distance of approximately 180° from one another, and a centering drill 26 axially centrally arranged in the drilling crown and projecting over its front face. The cutting edge 18 of the radially outermost cutting plate 14 projects radially over circumferential surfaces 48 of the drilling crown 12, while the working area of the innermost cutting plate radially approaches or overlaps the working area of the centering drill 26. In order to allow through holes to be cut with such a drilling tool without risk of damage, even in the case of deep holes, each one guide element 58 radially projects slightly less than the cutting edge 18 of the radially outermost cutting plate 14, and is arranged on the two circumferential surfaces 48 at an axial distance from the drilling crown front face and at a reciprocal angular distance differing from 180°.

The embodiments of the invention in which an exclusive property or privilege is claimed are defined as follows.

We claim:

1. In a drilling tool for machine tools comprising an elongated shank and a drilling crown, said shank defining a shaft axis of rotation extending along an axial length thereof and having a first front face at a distal end of said shank facing in a forward direction and at least one chip groove formed in the shank and extending in a rearward direction away from said first front face, said drilling crown having mounting means for facilitating a mounting of said drilling crown to said first front face of said shank, said drilling crown further including a second front face facing forwardly and spaced a predetermined distance forwardly from a rear face thereof interfacing with said first front face of said shank, said drilling crown further including at least two regions each with a respective arcuate circumferential surface and a corresponding number of chip channels in said arcuate circumferential surfaces, each said chip channel being disposed between mutually adjacent ones of said arcuate circumferential surfaces, each said chip channel being aligned axially so as to be essentially parallel one with the other and opening rearwardly into said chip groove of said shank mutually adjacent thereto, said regions having recesses formed therein proximate said chip channels, said drilling crown having at least one radially innermost cutting plate and one radially outermost cutting plate, each said cutting plate being seated in said respective recesses and disposed a radial distance outwardly from said shank axis, said cutting plates each defining a work area over which cutting is performed on a workpiece and disposed relative to said shaft axis so that said cutting performed in one said work area radially overlaps said cutting performed in said work area by said cutting plate radially adjacent thereto, each said cutting plate extending axially beyond said second front face of said drilling crown and have a first active cutting edge for said cutting operation and means thereon for effecting a guiding of said drilling tool during said cutting operation, said radially outermost cutting plate being disposed with said active cutting edge thereof extending radially outwardly beyond said corresponding arcuate circumferential surface, comprising the improvement wherein at least two guide elements are mounted to said regions on said drilling crown and disposed rearwardly a predetermined distance from said means on said cutting plates for effecting a guiding, said guide members projecting radially beyond said arcuate circumferential surfaces a predetermined distance less than the distance said radially outermost cutting plate extends, being spaced one from the other at an angular distance differing from 180° and contacting a wall of a bore being drilled only when said means for effecting a guiding is no longer effective during said cutting operation.

2. The drilling tool according to claim 1, wherein the guide elements are spaced from one another at an angular distance of 120° to 170°.

3. The drilling tool according to claim 1, wherein the guide elements are axially spaced from one another.

4. The drilling tool according to claim 1, wherein a further guide element is arranged at an axial distance rearwardly from one of the guide elements axially adjacent thereto in the area of the arcuate circumferential surfaces, and wherein the axially adjacent guide elements are spaced from one another in pairs at an angular distance differing from 180° in the range of 120° to 170°.

5. The drilling tool according to claim 1, wherein the guide elements are ball-like at a radially projecting part thereof so as to have the shape of a spherical segment.

6. The drilling tool according to claim 1, wherein the guide elements are radially adjustable.

7. The drilling tool according to claim 1, wherein at least the radially outermost cutting plate is radially adjustable on the drilling crown.

8. The drilling tool according to claim 5, wherein each guide element is formed by a pin arranged in a radial bore of the drilling crown and projecting with a ball-like end radially from the radial bore.

9. The drilling tool according to claim 8, wherein the radial bore is constructed as a taphole and the pin is a threaded pin threadedly engaged within said radial bore.

10. The drilling tool according to claim 8, wherein the pin can be clamped in the radial bore by means of a clamping screw.

11. The drilling tool according to claim 1, wherein at least a part of the guide element which projects radially beyond the drilling crown consists of a hard-metal or of ceramics.

12. The drilling tool according to claim 8, wherein the pin includes at its end projecting beyond the radial bore a soldered-on hard-metal part.

13. The drilling tool according to claim 1, wherein the drilling crown has two of said chip channels diametrically opposite one with respect to the other and has two of said regions diametrically opposite one with respect to the other, and wherein the cutting plates are spaced from one another individually or in groups at an angular distance of approximately 180°.

14. The drilling tool according to claim 1, wherein the guide elements are spaced from the cutting plates at an angular distance differing from 90° and differing from 180°.

15. The drilling tool according to claim 14, wherein the radially outermost cutting plate and the guide element adjacent thereto are arranged at an angular distance of 45° to 80° from one another.

16. The drilling tool according to claim 14, wherein the radially innermost cutting plate and the guide element adjacent to it are arranged at an angular distance of 15° to 45° from one another.

17. The drilling tool according to claim 1, wherein a centering drill projects axially centrally beyond the second front face of the drilling crown and axially beyond the active cutting edges of the cutting plates and is releasably and axially adjustably received in the drilling crown, and wherein the work area of the radially innermost cutting plate approaches or overlaps radially a work area of the centering drill.

18. The drilling tool according to claim 17, wherein the centering drill can be axially moved by means of an adjusting screw and can be clamped on the drilling crown by means of a clamping screw.

19. The drilling tool according to claim 1, wherein the cutting plates are formed as hexagonal reversing cutting plates which each project with said active cutting edge defining two cutting edges beyond the second front face of the drilling crown.

20. The drilling tool according to claim 19, wherein the radially outermost reversing cutting plate together with an adjacent reversing cutting plate disposed radially inwardly are arranged in a cassette, which said cassette can be radially offset in the respective recess.

21. The drilling tool according to claim 19, wherein the two cutting edges of each cutting plate are radially outwardly inclined with respect to the shaft axis.

22. The drilling tool according to claim 21, wherein two radially outermost cutting plates are arranged on said regions on the same radius and radially extend beyond the arcuate circumferential surfaces.

23. The drilling tool according to claim 22, wherein the centering pin is formed by a rearward end of the centering drill which extends through a through center bore in the drilling crown.

24. The drilling tool according to claim 18, wherein the adjusting screw has an adjusting cone acting against a rearward end of the centering drill.

25. In a drilling tool for machine tools comprising an elongated shank and a drilling crown, said shank defining a shaft axis of rotation extending along an axial length thereof and having a first front face at a distal end of said shank facing in a forward direction and at least one chip groove formed in the shank and extending in a rearward direction away from said first front face, said drilling crown having mounting means for facilitating a mounting of said drilling crown to said front face of said shank, said drilling crown further including a second front face facing forwardly and spaced a predetermined distance forwardly from a rear face thereof interfacing with said first front face of said shank, at least two regions each with a respective arcuate circumferential surface and a corresponding number of chip channels in said arcuate circumferential surfaces, each said chip channel being disposed between mutually adjacent ones of said arcuate circumferential surfaces, each said chip channel being aligned axially so as to be essentially parallel one with the other and opening rearwardly into said chip groove of said shank mutually adjacent thereto, said regions having recesses formed therein proximate said chip channels, said drilling crown having at least one radially innermost cutting plate and one radially outermost cutting plate, each said cutting plate being seated in said respective recesses and disposed a radial distance outwardly from said shank axis, said cutting plates each defining a work area over which cutting is performed on a workpiece and disposed relative to said shaft axis so that said cutting performed in one said work area radially overlaps said cutting performed in said work area by said cutting plate radially adjacent thereto, each said cutting plate extending axially beyond said second front face of said drilling crown and have a first active cutting edge for said cutting operation, and said radially outermost cutting plate being disposed with said active cutting edge thereof extending radially outwardly beyond said corresponding arcuate circumferential surface, comprising the improvement wherein at least two guide elements are mounted to said regions on said drilling crown and disposed rearwardly a predetermined distance from said work areas of said cutting plates, said guide members projecting radially beyond said arcuate circumferential surfaces a predetermined distance less than the distance said radially outermost cutting plate extends and being spaced one from the other at an angular distance differing from 180° and wherein the drilling crown has a transverse rib at an end opposite the second front face of said drilling crown which projects beyond a plane surface facing rearwardly and can be guided into a transverse groove of the shank, which transverse groove is defined by a flat countersurface and can be clamped to said transverse rib by means of clamping screws, and a centering pin which is received within a center mating hole of the shank and projects axially centrally beyond the transverse rib.

26. The tool according to claim 25, wherein conical recesses are arranged offset with respect to one another in a longitudinal direction of the transverse rib in two sides of the transverse rib, which sides lie opposite to one another and are perpendicular with respect to the plane surface, into which recesses a screw with a conical tip is guided in a taphole of the shank, extends through the sides of the transverse groove and can be screwed with an axial shift so that the drilling crown and the shank are pressed axially against one another at the plane surface of the drilling crown.

* * * * *

UNITED STATES PATENT AND TRADEMARK OFFICE
CERTIFICATE OF CORRECTION

PATENT NO. : 5 425 604
DATED : June 20, 1995
INVENTOR(S) : Gerhard Scheer et al

It is certified that error appears in the above-indentified patent and that said Letters Patent is hereby corrected as shown below:

Column 8, line 24; change "claim 22," to ---claim 25,---.

Signed and Sealed this

Twenty-sixth Day of March, 1996

Attest:

BRUCE LEHMAN

*Attesting Officer*           *Commissioner of Patents and Trademarks*